United States Patent [19]

Kunimoto

[11] Patent Number: 4,831,576

[45] Date of Patent: May 16, 1989

[54] MULTIPLIER CIRCUIT

[75] Inventor: Toshifumi Kunimoto, Hamamatsu, Japan

[73] Assignee: Yamaha Corporation, Shizuoka, Japan

[21] Appl. No.: 47,034

[22] Filed: May 4, 1987

[30] Foreign Application Priority Data

May 6, 1986 [JP] Japan .................. 61-103652
May 6, 1986 [JP] Japan .................. 61-103653

[51] Int. Cl.$^4$ .......................... G06F 7/52; G06F 7/38
[52] U.S. Cl. ..................................... 364/754; 364/745
[58] Field of Search ................ 364/754, 745, 757, 758

[56] References Cited

U.S. PATENT DOCUMENTS

| Re. 31,821 | 2/1985 | Okamoto | 84/1.13 |
| 3,805,043 | 4/1974 | Clary | 364/745 |
| 3,906,199 | 9/1975 | Kieburtz et al. | 364/745 |
| 4,367,536 | 1/1983 | Vignes et al. | 364/745 |
| 4,589,084 | 5/1986 | Fling et al. | 364/745 |
| 4,598,382 | 7/1986 | Sato | 364/745 |

FOREIGN PATENT DOCUMENTS

5417548 2/1974 Japan .

Primary Examiner—Gary V. Harkcom
Assistant Examiner—Dale M. Shaw
Attorney, Agent, or Firm—Spensley Horn Jubas & Lubitz

[57] ABSTRACT

A multiplier circuit for performing a multiplication operation repeatedly by circulating output data thereof to input terminal thereof via a feedback line. The multiplier circuit comprises a multiplier and an adder at least. The multiplier multiplying input data by multiplier coefficient data of which value indicates a decimal under one so as to obtain product data. When the whole product data is inputted to the adder, compensation data of which value indicates a decimal and changes at random is inputted to the adder. The adder adds the product data and the compensation data together so as to obtain addition data. The integral portion within the addition data is outputted as output data. When integral data within the product data is inputted to the adder, a control signal of which value changes based on a value of decimal data within the product data is inputted to the adder. The adder adds the product data and the value of the control signal together so as to obtain addition data which is outputted as output data.

10 Claims, 6 Drawing Sheets

| PRIORITY SELECTING ENCODER 209 | | | | | | | | DECODER 210 | | | | |
|---|---|---|---|---|---|---|---|---|---|---|---|---|
| TERMINAL | | | | | | | | TERMINAL | | | PROBABILITY "1" | TERMINAL "1" |
| $T_{47}$ | $T_{46}$ | $T_{45}$ | $T_{44}$ | $T_{43}$ | $T_{42}$ | $T_{41}$ | $T_{40}$ | $T_{52}$ | $T_{51}$ | $T_{50}$ | | |
| X | X | X | X | X | X | X | 1 | 1 | 1 | 1 | 1/2 | $T_{77}$ |
| X | X | X | X | X | X | 1 | 0 | 1 | 1 | 0 | 1/4 | $T_{76}$ |
| X | X | X | X | X | 1 | 0 | 0 | 1 | 0 | 1 | 1/8 | $T_{75}$ |
| X | X | X | X | 1 | 0 | 0 | 0 | 1 | 0 | 0 | 1/16 | $T_{74}$ |
| X | X | X | 1 | 0 | 0 | 0 | 0 | 0 | 1 | 1 | 1/32 | $T_{73}$ |
| X | X | 1 | 0 | 0 | 0 | 0 | 0 | 0 | 1 | 0 | 1/64 | $T_{72}$ |
| X | 1 | 0 | 0 | 0 | 0 | 0 | 0 | 0 | 0 | 1 | 1/128 | $T_{71}$ |
| 1/0 | 0 | 0 | 0 | 0 | 0 | 0 | 0 | 0 | 0 | 0 | 1/128 | $T_{70}$ |

MULTIPLIER CIRCUIT

BACKGROUND OF THE INVENTION

1. Field of the Invention

The present invention generally relates to multiplier circuits, and more particularly to a multiplier circuit which can be applied to a digital filter and a reverberation effect apparatus for an electronic musical instrument in which output data of the multiplier circuit is fed back to input terminal thereof so as to repeatedly perform the multiplication operation, for example.

2. Prior Art

Generally, the multiplier circuit is used for the digital filter, such as a secondary IIR (Infinite Impulse Response) filter and a lattice filter, and an envelope generating circuit and a reverberation effect apparatus of the electronic musical instrument, for example.

In this case, the multiplier circuit outputs product data which indicates the multiplication result thereof. This product data is processed in a data processing circuit and is fed back to the input terminal of the multiplier circuit. In other words, the multiplication operation is repeatedly performed by the multiplier circuit. In order to prevent a divergence of product data from being occurred by repeatedly performing the multiplication operation, a multiplier coefficient (or multiplier data) must be selected to a value smaller than "1".

Figure 1:
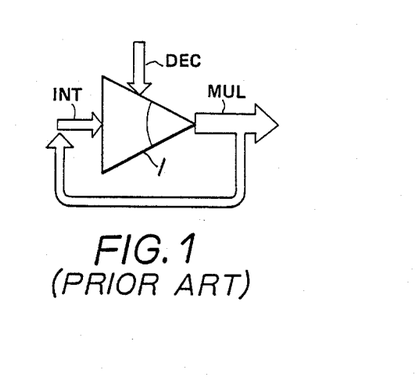
FIG. 1 is a block diagram showing a conventional multiplier circuit.

As shown in FIG. 1, when integral input data INT or M bits is multiplied by decimal multiplier data DEC in a multiplier circuit 1, product data MUL of maximum M+N bits can be obtained. This product data MUL consists of integral data of M bits and decimal data of N bits. Hereinafter, data indicating an integral number will be simply referred to as integral data, and data indicating a decimal will be simply referred to as decimal data in the present specification.

As described before, the product data MUL is supplied to the input terminal of the multiplier circuit 1 as the input data INT by way of a feedback line as shown by an arrow in FIG. 1. In the case where a bit number (a digit number) of the product data MUL are different from that of the input data INT, required bit number of the multiplier circuit 1 differs at every time when one multiplication operation is performed. Hence, a complicated multiplier circuit or a multiplier circuit having a large bit number must be required.

In above case, all of the product data MUL or only integral data of M bits within the product data MUL is outputted to an external circuit. However, the integral data of M bits within the product data MUL is only used as feedback data of the multiplier circuit 1, so that the required bit number of the multiplier circuit 1 becomes constant.

However, when the integral data of M bits within the first product data MUL of M+N bits is used as the feedback data of the multiplier circuit 1, the next product data MUL must includes error data which corresponds to decimal data of the first product data MUL. This error data is accumulated at ever time when the one multiplication operation is performed, so that the obtained value of the product data MUL may largely differ from the true value thereof. Besides the case where the multiplication operation is repeatedly performed by the multiplier circuit, in another case where the integral data within the product data MUL is only outputted to the external circuit, the error data corresponding to the round-down decimal data within the product data must be existed.

Therefore, it can be considered that the product data MUL is rounded to unit's place instead of rounding down the decimal data within the product data MUL. However, when the binary product data MUL is rounded to unit's place, the constitution of the multiplier circuit must be complicated.

Figure 2:
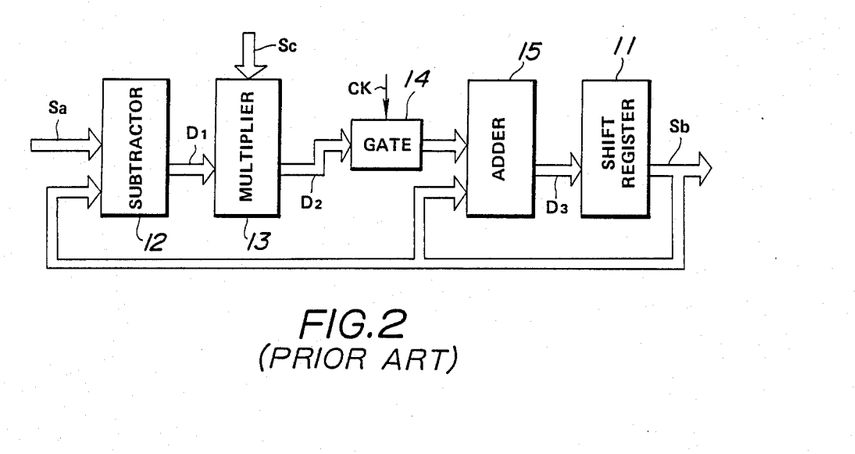
FIG. 2 is a block diagram showing an example of a function signal generating circuit which employs a conventional multiplier circuit.

As an applied example of such multiplier circuit, a function signal generating circuit shown in FIG. 2 has been proposed in U.S. Pat. No. Re.31821. This function signal generating circuit generates a waveform signal indicating an envelope waveform for the electronic musical instrument.

In FIG. 2, data $S_b$ having a present value obtained at an output terminal of a shift register 11 is passed through a feedback line and is supplied to a subtractor 12 wherein the data $S_b$ is subtracted from data $S_a$ having a target value so as to obtain subtraction data $D_1$. This subtraction data $D_1$ is multiplied by small coefficient data $S_c$ having a value smaller than "1" ($2^{-8}$, for example) in a multiplier 13. Hence, data $D_2$ obtained at an output terminal of the multiplier 13 has a small value corresponding to a difference between the data $S_a$ and the data $S_b$.

The data $D_2$ is supplied to a gate circuit 14 wherein the data $D_2$ is supplied to one input terminal of an adder 15 based on a timing of a clock signal CK. The data $S_b$ is supplied to another input terminal of the adder 15 wherein the data $D_2$ is added to the data $S_b$ based on the timing of the clock signal CK so as to obtain addition data $D_3$. The value of the addition data $D_3$ is increased or decreased by the value of the data $D_2$ with a lapse of time. The addition data $D_3$ is supplied to the shift register 11.

Figure 3:
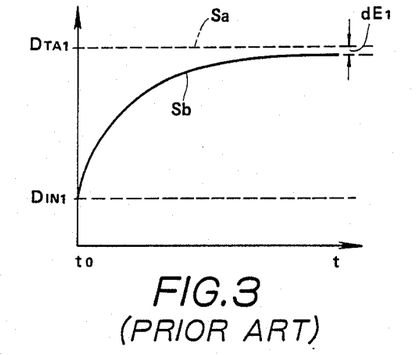
FIGS. 3 and 4 are graphs showing characteristics of the conventional function signal generating circuit shown in FIG. 2.
Figure 4:
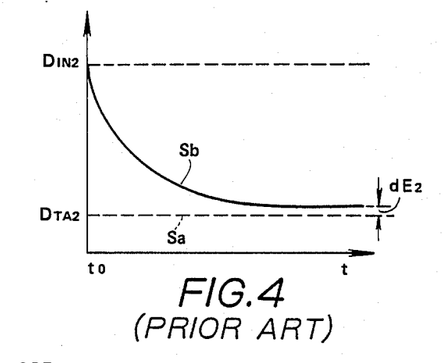

The shift register 11 operates as a delay circuit, so that the shift register 11 outputs the delayed addition data $D_3$ as new data $S_b$ at every time when a delay time is passed by. This new data $S_b$ is supplied to the subtractor 12, and the operation described above is performed repeatedly. Hence, as shown in FIGS. 3 and 4, the value of the data $S_b$ is gradually increasing or gradually decreasing so as to approach to the target value of the data $S_b$ with a lapse of time, for example. These leading and trailing waveforms shown in FIGS. 3 and 4 are used as function signals for the electronic musical instrument.

As the value of the data $S_b$ approaches that of the data $S_a$, the value of the data $D_2$ of the multiplier 13 becomes smaller. When the value of the data $D_2$ becomes smaller than a minimum value so that the adder 15 can not perform the addition operation, the adder 15 rounds down the data $D_2$ and the data $D_2$ becomes the error data. Due to this error data, the value of the data $S_b$ can not reach to that of the data $S_a$.

In short, a lower bit portion (the decimal data) of the data $D_2$ outputted from the multiplier 13 is rounded down, and an upper bit portion (the integral data) of the data $D_2$ is only used and supplied to the adder 15.

Thus, as shown in FIGS. 3 and 4, it becomes impossible to add the data $S_b$ and the data $D_2$ together in the adder 15. Hence, the conventional circuit is disadvantageous in that errors $dE_1$ and $dE_2$ will be produced in the function signal.

SUMMARY OF THE INVENTION

It is accordingly a primary object of the present invention to provide an improved multiplier circuit in which the error component included within the multiplication result thereof can be reduced with a simple constitution thereof.

According to one aspect of the invention, there is provided a multiplier circuit comprising: (a) multiplier means for multiplying input data by multiplier coefficient data so as to obtain product data; (b) compensation means for generating error compensation data which is constituted by lower data of predetermined lower bits and upper data of upper bits above the predetermined lower bits, the lower data being constituted by random number data and a value of the upper data being equal to zero; (c) addition means for adding the error compensation data to the product data so as to obtain addition data, and output data being obtained by removing data of the predetermined lower bits from the addition data.

According to another aspect of the invention, there is provided a multiplier circuit comprising: (a) multiplier means for multiplying input data by multiplier coefficient data so as to obtain product data, the product data being divided into lower data of predetermined lower bits and upper data of upper bits above the predetermined lower bits; (b) carry control means for generating a control signal, a value of the control signal becoming zero or one in accordance with a probability corresponding to a value of the lower data within the product data; and (c) addition means for adding the upper data and the value of control signal together so as to obtain addition data, and the addition data being outputted as output data.

BRIEF DESCRIPTION OF THE DRAWINGS

Further objects and advantages of the present invention will be apparent from the following description, reference being had to the accompanying drawings wherein preferred embodiments of the present invention are clearly shown.

In the drawings.

DESCRIPTION OF THE PREFERRED EMBODIMENTS OF THE INVENTION

Referring now to the drawings, wherein like reference characters designate like or corresponding parts throughout the several views.

Figure 5:
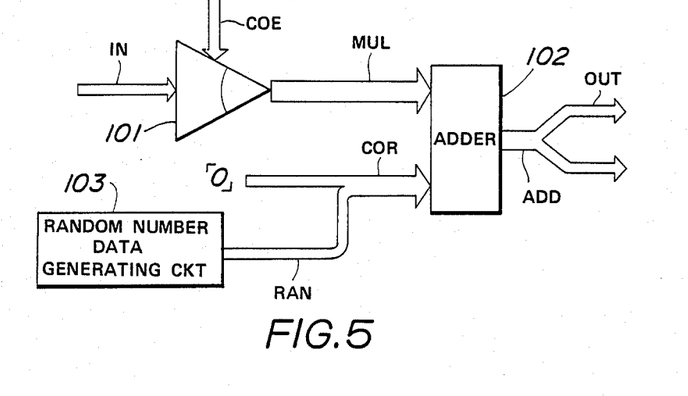
FIG. 5 is a block diagram showing a first embodiment of the invention.

FIG. 5 is a block diagram showing a first embodiment of the invention. In FIG. 5, integral input data IN of M bits is supplied to a multiplier 101. In addition, decimal multiplier coefficient data COE of N bits of which value is smaller than "1" is supplied to the multiplier 101 wherein the data IN is multiplied by the data COE so as to obtain product data MUL of M+N bits. The product data MUL is supplied to an adder 102. In addition, error compensation data COR of M+N bits is supplied to the adder 102.

Figure 6:
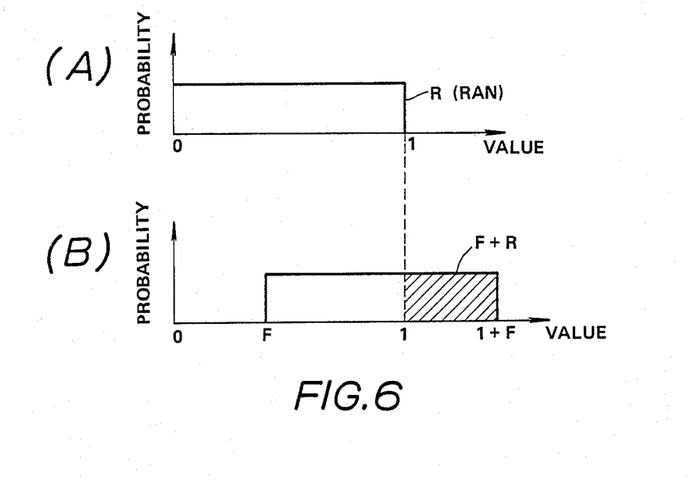
FIGS. 6A and 6B show diagrams for explaining probability distributions of data in the multiplier circuit shown in FIG. 5.

A random number data generating circuit 103 generates random number data RAN of N bits which has a probability distribution shown in FIG. 6(A). Integral data of lower N bits within the data COR comprises of the random number data RAN of N bits, and values of bits in decimal data of upper M bits within the data COR are all set to "0". Therefore, the value R of the data COR lies between "0" and "1" under an eve probability. More specifically, the value R exists within $0 \leq = R < 1$. Hereinafter, the value R will be referred to as a random number R (or a probability variable R).

The adder 102 adds the product data MUL and the error compensation data COR together so as to obtain addition data ADD. The integral data of upper M bits within the addition data ADD is outputted as output data OUT.

The value X of the product data MUL comprises of an integral number I and a decimal F as shown in the following formula (1).

$$X = I + F \qquad (1)$$

Hence, the value Y of the addition data ADD can be expressed as the following formula (2).

$$Y = X + R = I + F + R \qquad (2)$$

In the formula (2), the random number R is a probability variable having the probability distribution as shown in FIG. 6(A), hence, the value Y becomes the probability variable as well. The integral value within the value Y is equal to the integral number I when the sum value of F+R is smaller than "1". However, the integral value within the value Y is equal to the value of I+1 when the sum value of F+R is larger than "1".

Since the random number R lies between "0" and "1" under the even probability distribution as shown in FIG. 6(A), the value F+R lies between the value F and the value F+1 under the even probability distribution as shown in FIG. 6(B). In this case, when the value F+R becomes larger than "1", the value F+R must lie between "1" and the value F+1. Hence, the probability of the case where the value F+R becomes larger than "1" will be expressed as a probability F.

When the decimal value F of the product data MUL is equal to 0.2, for example, the sum value of F+R lies between 0.2 and 1.2 under the even probability. Hence, the probability in the case where the sum value of F+R exceeds "1" so that the integral portion of the output data OUT is increased by "1" is 0.2.

Thus, when the decimal value F of the product data MUL is relatively small, the probability (=F) in the case where the value of the output data OUT becomes I+1 is small. On the other hand, as the decimal value F becomes larger, the above probability becomes larger.

The probability in the case where the integral value I of the product data MUL is increased by "1" is expressed as F, and the probability in the case where the integral value I is not increased by "1" is expressed as 1−F. Hence, it is possible to express an expected value E(dI) for an increased value dI of the output data OUT with respect to the integral value I as the following formula (3).

$$E(dI) = 1 \times F + 0 \times (1-F) = F \qquad (3)$$

As a result, an expected value of the output data OUT is identical to a sum value of the integral value I and the expected value E(dI), i.e., a sum value I+F. Hence, the expected value of the output data OUT becomes identical to the value of the product data MUL.

Therefore, the present embodiment differs from the conventional multiplier circuit in that the integral value I is compensated based on the decimal value F under the even probability distribution instead of rounding down the decimal value F. Hence, it is possible to make the error small even when the output data OUT comprises of the data of upper bits within the product data MUL.

Furthermore, the expected value of the output data OUT agrees with the value of the product data MUL. Hence, it is possible to effectively prevent the divergence of the output data OUT from being occurred without accumulating errors even when the output data OUT is fed back to the input data IN via a processing circuit so as to repeatedly perform the multiplication operation.

In the present embodiment, the bit number M of the input data IN is equal to the bit number M of the output data OUT, however, the present invention is not limited to that. Hence, it is possible to apply the present embodiment for the case where the bit number of the input data IN is different from the bit number of the output data OUT. In this case, the bit number of the random number data must be equal to the bit number of the data of lower bits which is included within the addition data ADD but is removed from the output data OUT.

Figure 7:
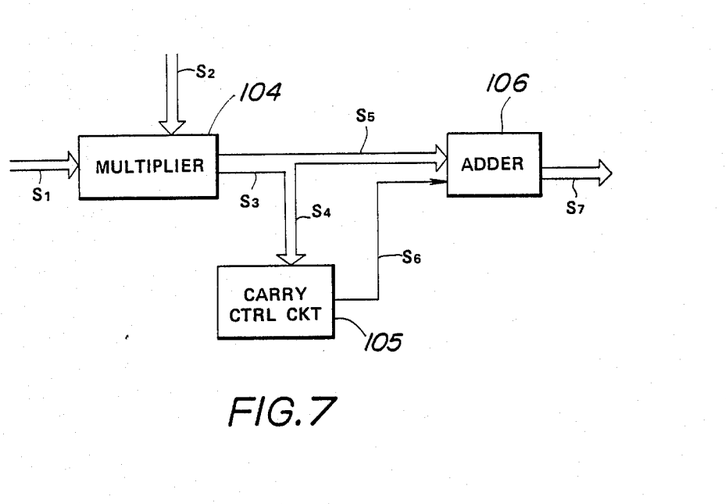
FIG. 7 is a block diagram showing a second embodiment of the invention.

Next, description will be given with respect to a second embodiment of the invention in conjunction with FIG. 7. In FIG. 7, input data $S_1$ is multiplied by multiplier coefficient data $S_2$ in a multiplier 104 wherein product data $S_3$ is obtained and is divided into decimal data $S_4$ of lower bits and integral data of $S_5$ of upper bits. A carry control circuit 105 generates a control signal $S_6$ for adding "1" to the value of the integral data $S_5$ under a probability corresponding to the value of the decimal data $S_4$. An adder 106 adds the value of the integral data $S_5$ and the value of the control signal $S_6$ together so as to obtain output data $S_7$.

The logical level of the above control signal $S_6$ becomes "1" under the probability corresponding to the value of the data $S_4$. Generally, the decimal value indicates a rate concerning the integral value "1" (a percentage, for example), in other words, the decimal value indicates a probability in which the decimal value becomes the integral value "1". More specifically, the decimal data $S_4$ indicates the required time in which the decimal data $S_4$ becomes the integral value "1" when the decimal data $S_4$ is repeatedly added. Hence, the value of the decimal data $S_4$ becomes smaller as the above required time becomes longer. On the other hand, the value of the decimal data $S_4$ becomes larger as the above required time becomes shorter.

Thus, the frequency in which the control signal $S_6$ having a logical value "1" is supplied to the adder 106 corresponds to the value of the decimal data $S_4$. When the logical value of the control signal becomes "1", the output data $S_7$ is increased by "1".

As a result, an expected value of the integral output data $S_7$ becomes substantially equal to the value of the product data $S_3$. Hence, it is possible to reduce the value of the error which is produced by rounding down the decimal data $S_4$.

Next, description will be given with respect to a function signal generating circuit which employs the second embodiment in conjunction with FIGS. 8 to 14.

Figure 8:
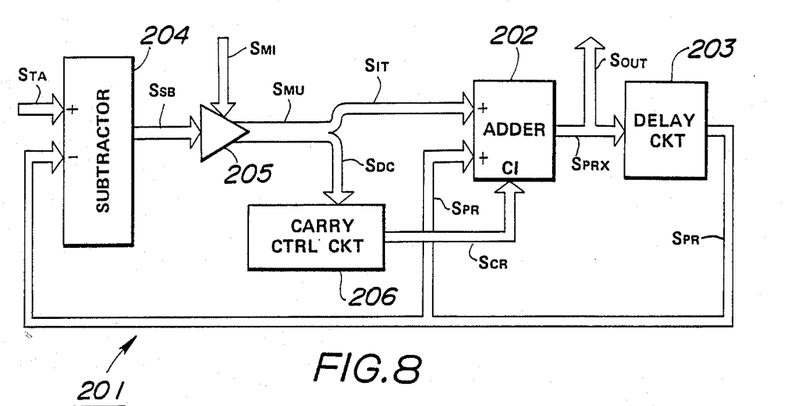
FIG. 8 is a block diagram showing a function signal generating circuit which employs the multiplier circuit of the second embodiment of the invention.

In FIG. 8, 201 designates the function signal generating circuit for use in the envelope signal generating circuit for the electronic musical instrument. In FIG. 8, present value data $S_{PRX}$ is constituted by parallel data of eight bits and is obtained at an output terminal of an adder 202 (which corresponds to the adder 106 shown in FIG. 7). This present value data $S_{PRX}$ is outputted as output data SOUT of the function signal generating circuit 201 and is fed back to an input terminal of a subtractor 204 via a delay circuit 203 as delayed present value data $S_{PR}$.

The subtractor 204 subtracts the delayed present value data $S_{PR}$ from target value data $S_{TA}$ which is constituted by parallel data of eight bits so as to obtain subtraction data $S_{SB}$ which is also constituted by parallel data of eight bits. This subtraction data $S_{SB}$ is supplied to a multiplier 205 (which corresponds to the multiplier 104 shown in FIG. 7).

The multiplier 205 multiplies the subtraction data $S_{SB}$ of eight bits by multiplier coefficient data $S_{MI}$ which is constituted by parallel data of eight bits so as to obtain product data $S_{MU}$ which is constituted by parallel data of sixteen bits.

The value of the multiplier coefficient data $S_{MI}$ is smaller than "1", i.e., the value of the data $S_{MI}$ is equal to $2^{-8}$, for example. In this case, the product data $S_{MU}$ of sixteen bits comprises of integral data $S_{IT}$ of upper eight bits and decimal data $S_{DC}$ of lower eight bits.

The integral data $S_{IT}$ is supplied to the adder 202 wherein the integral data $S_{IT}$ and the delayed present value data $S_{PR}$ are added together so as to obtain new present value data (addition data) $S_{PRX}$. This new present value data $S_{PRX}$ is outputted via the delay circuit 203 as new delayed present value data $S_{PR}$.

The decimal data $S_{DC}$ is supplied to a carry control circuit 206 (which corresponds to the carry control circuit 105 shown in FIG. 7) wherein a control signal $S_{CR}$ for adding "1" to the value of the integral data $S_{IT}$ is obtained and is supplied to a carry input terminal CI of the adder 202.

Figure 9:
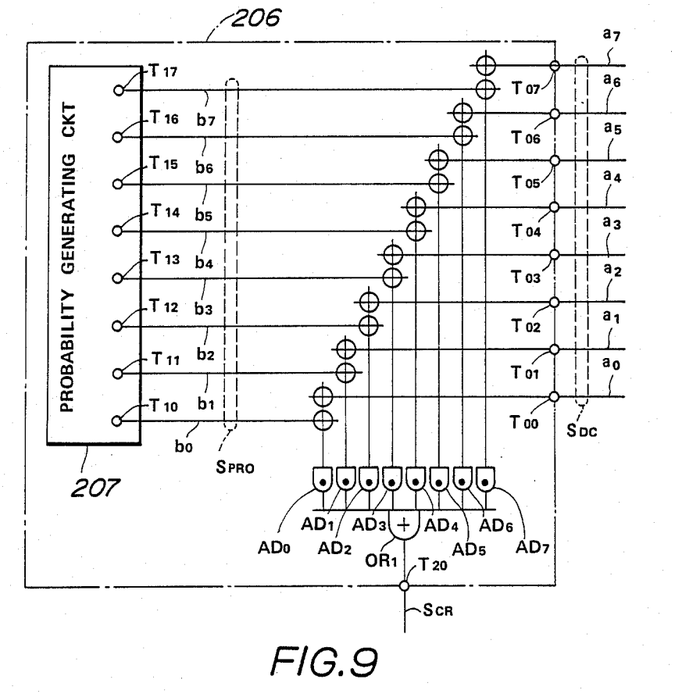
FIGS. 9 to 11 are block diagrams showing detailed constitutions of a main part of the circuit shown in FIG. 8.

FIG. 9 shows a detailed constitution of the carry control circuit 206. The above decimal data $S_{DC}$ of eight bits is constituted by bit data $a_0$ to $a_7$. In FIG. 9, the bit data $a_0$ to $a_7$ are passed through respective terminals $T_{00}$ to $T_{07}$ and are supplied to respective AND circuits $AD_0$ to $AD_7$.

In addition, the carry control circuit 206 includes a probability generating circuit 207 which generates probability data $S_{PRO}$ of eight bits. The probability data $S_{PRO}$ of eight bits is constituted by bit data $b_0$ to $b_7$ corresponding to respective bit data $a_0$ to $a_7$. The bit data $b_0$ to $b_7$ are outputted from respective terminals $T_{10}$ to $T_{17}$ of the probability generating circuit 207 and are supplied to respective AND circuits $AD_0$ to $AD_7$.

All output data from the AND circuits $AD_0$ to $AD_7$ are supplied to an OR circuit $OR_1$ wherein the control signal $S_{CR}$ is outputted via a terminal $T_{20}$.

The probability data $S_{CR}$ of eight bits is constituted by pulse signals indicating a binary number within values $2^0$ to $2^7$. In addition, the probability data is identical to data of which logical level becomes "1" under a probability corresponding to weighted bit data $a_0$ to $a_7$ with a lapse of time.

Figure 10:
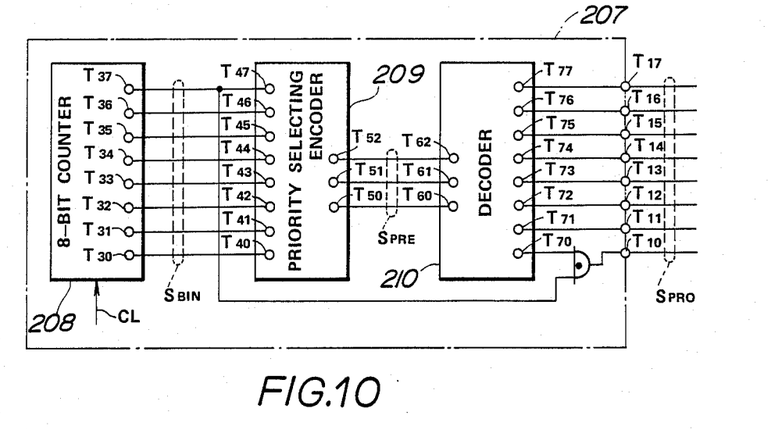

Next detailed description will be given with respect to the probability generating circuit 207 in conjunction with FIGS. 10 to 12. In FIG. 10, the probability generating circuit 207 comprises a 8-bit counter 208, a priority selecting encoder 209 and a decoder 210. The 8-bit counter 208 counts a clock signal CL having a predetermined frequency so as to output binary data $S_{BIN}$ of eight bits from terminals $T_{30}$ to $T_{37}$ to terminals $T_{40}$ to $T_{47}$ of the priority selecting encoder 209.

Figure 11:
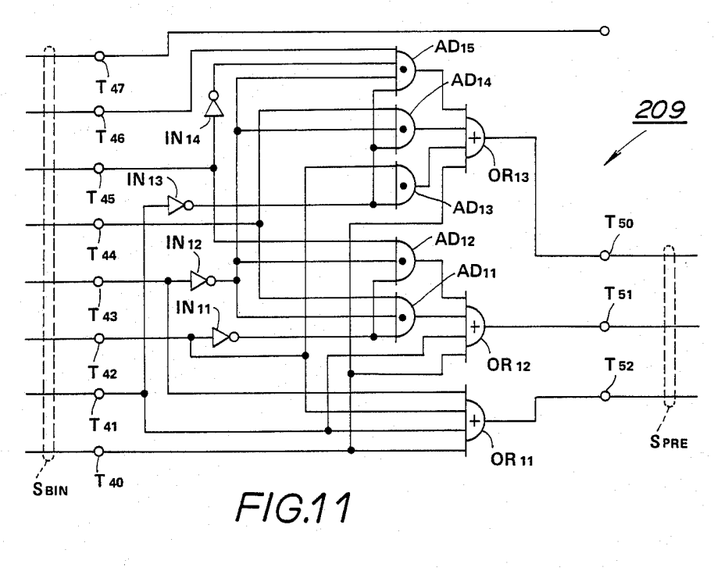

As shown in FIG. 11, the priority selecting encoder 209 is constituted by inverters $IN_{11}$ to $IN_{14}$, AND circuits $AD_{11}$ to $AD_{15}$ and OR circuits $OR_{11}$ to $OR_{13}$. As shown in FIG. 12, the priority selecting encoder 209 checks the values of terminals $T_{40}$ to $T_{47}$ from the terminal $T_{40}$ to the terminal $T_{47}$ so as to select a first terminal of which value is "1", so that the priority selecting encoder 209 outputs binary encode data $S_{PRE}$ of three bits as shown in FIG. 12 via terminals $T_{50}$ to $T_{52}$.

In this case, a value of a bit datum at the terminal $T_{40}$ becomes "1" under a probability of $\frac{1}{2}$. In addition, a value of a bit datum at the terminal $T_{41}$ becomes "1" and the value of the bit datum at the terminal $T_{40}$ becomes "0" under a probability of $\frac{1}{2}^2 (=\frac{1}{4})$. Furthermore, a value of a bit datum at the terminal $T_{42}$ becomes "1" and other values of bit data at terminals $T_{40}$ and $T_{41}$ becomes "0" under a probability of $\frac{1}{2}^3 (=\frac{1}{8})$. Similarly, the probability in the case where one terminal within the terminals $T_{40}$ to $T_{47}$ becomes "1" and other lower terminals thereof become "0" can be shown in a column "PROBABILITY "1"" in FIG. 12.

In the present embodiment, however, the probability is determined to 1/128 in the case where a value of a bit datum at the terminal $T_{37}$ becomes "0" and "1" and other terminals $T_{40}$ to $T_{46}$ become "0".

When one hundred and twenty eight clock pulses are supplied to the 8-bit counter 208 in a reference period $T_{REF}$, the encode data $S_{PRE}$ of "111" is outputted from the terminals $T_{52}$ to $T_{50}$ in a total period $T_{REF}/2$. Hence, the encode data $S_{PRE}$ of "111" can be obtained sixty four times within the reference period $T_{REF}$.

In addition, the encode data $S_{PRE}$ of "110" is outputted from the terminals $T_{52}$ to $T_{50}$ in a total period $T_{REF}/4$ (which corresponds to thirty two pulses of the clock signal CL). Furthermore, the encode data $S_{PRE}$ of "101" is outputted from the terminals $T_{52}$ to $T_{50}$ in a total period $T_{REF}/8$ (which corresponds to sixteen pulses of the clock signal CL). Similarly, the total period concerning each data outputted from the terminals $T_{52}$ to $T_{50}$ can be calculated by multiplying the reference period $T_{REF}$ by the corresponding probability shown in FIG. 12. Therefore, the data indicating the probabilities $\frac{1}{2}$, $\frac{1}{4}$, $\frac{1}{8}$, ..., 1/128 shown in FIG. 12 can be obtained based on the encode data $S_{PRE}$.

The encode data $S_{PRE}$ is outputted from the terminals $T_{50}$ to $T_{52}$ of the priority selecting encoder 209 to terminals $T_{60}$ to $T_{62}$ of the decoder 210. The decoder 210 selects one terminal within terminals $T_{70}$ to $T_{77}$ and outputs a bit datum having a logical level of "1" via the selected terminal based on the encode data $S_{PRE}$ as shown in a column "TERMINAL "1"" in FIG. 12. In this case, the probabilities in which the logical levels of the terminals $T_{77}$, $T_{76}$, $T_{75}$, ..., $T_{71}$, $T_{70}$ become "1" can be respectively described as $\frac{1}{2}$, $\frac{1}{4}$, $\frac{1}{8}$, In other words, cycles in which the logical levels of the terminals $T_{76}$, $T_{75}$, ..., $T_{71}$, $T_{70}$ become "1" can be obtained by multiplying the cycle, in which the logical level of the terminal $T_{77}$ becomes "1", by $2^1$, $2^2$, ..., $2^6$, $2^7$ respectively.

The bit data at terminals $T_{70}$, $T_{71}$, ..., $T_{76}$, $T_{77}$ are outputted via the terminals $T_{10}$, $T_{11}$, ..., $T_{16}$, $T_{17}$ and are supplied to respective AND circuits $AD_0$, $AD_1$, ..., $AD_6$, $AD_7$ as the probability data $S_{PRO}$ as shown in FIG. 9.

Next, description will be given with respect to the operation of the embodiment as described in conjunction with FIGS. 8 to 12. When the function signal generating circuit 201 shown in FIG. 8 starts to work at a time $t_0$ shown in FIG. 13, the subtractor 204 outputs the integral target value data $S_{TA}$ as the subtraction data $S_{SB}$ into the multiplier 205 wherein the subtraction data $S_{SB}$ is multiplied by the multiplier coefficient data $S_{MI}$ of eight bits.

As a result, the multiplier 205 outputs the product data $S_{MU}$ of sixteen bits comprised of the integral data $S_{IT}$ of upper eight bits and the decimal data $S_{DC}$ of lower eight bits. The integral data $S_{IT}$ is added to the present value data $S_{PR}$, and the decimal data $S_{DC}$ is converted into the control signal $S_{CR}$ in the carry control circuit 206.

In the carry control circuit 206 shown in FIG. 9, bit data within the bit data $a_0$ to $a_7$ which have logical levels of "1" are supplied to corresponding AND circuits within the AND circuits $AD_0$ to $AD_7$, so that corresponding bit data within the bit data $b_0$ to $b_7$ are passed through the corresponding AND circuits within the AND circuits $AD_0$ to $AD_7$ and are supplied to the OR circuit $OR_1$ so as to output the control signal $S_{CR}$.

For instance, when the decimal data $S_{DC}$ of eight bits is described as "01000010" so that values of the bit data $a_6$ and $a_1$ are "1" and values of other bit data $a_7$, $a_5$ to $a_2$ and $a_0$ are "0". Hence, only the bit data $b_6$ and $b_1$ are sampled via the AND circuits $AD_6$ and $AD_1$ corresponding to the bit data $a_6$ and $a_1$ having the logical levels of "1" by the OR circuit $OR_1$ wherein the control signal $S_{CR}$ will be outputted based on the values of the bit data $b_6$ and $b_1$.

Figure 12:
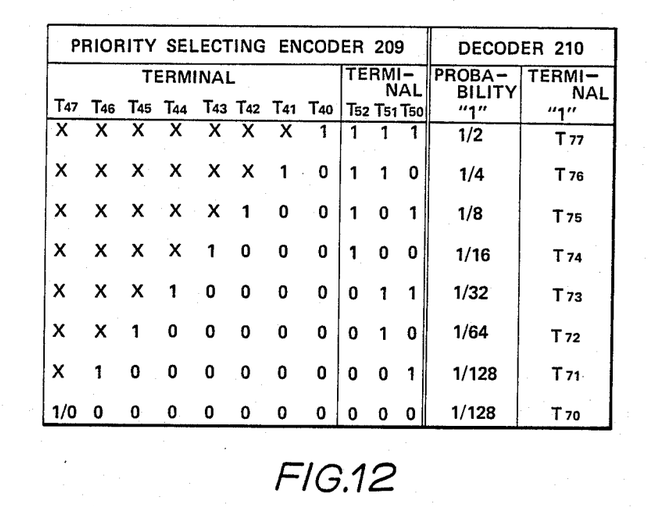
FIG. 12 is a table for explaining the main part of the circuit shown in FIG. 8.
Figure 13:
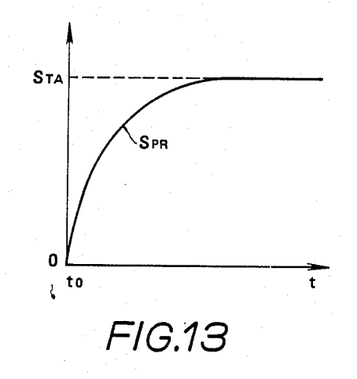
FIG. 13 is a graph showing a characteristics of the circuit shown in FIG. 8.

As shown in FIG. 12, the bit data $b_6$ and $b_1$ have respective probabilities of $\frac{1}{4}$ and 1/128. In other words, the value of the bit datum $b_6$ becomes "1" by a 4-clock cycle, and the value of the bit datum $b_1$ becomes "1" by a 128-clock cycle. On the other hand, the logical level of the control signal $S_{CR}$ becomes "1" so that "1" is added to the value of the integral data $S_{IT}$ in the adder 202 in a certain timing. This certain timing concerning the bit datum $a_6$ within the decimal data $S_{DC}$ is occurred by a 4-clock-pulse cycle, and this certain timing concerning the bit datum $a_1$ is occurred by a 128-clock-pulse cycle.

Thus, the adder 202 adds the integral data $S_{IT}$ of eight bits and the integral delayed present value data $S_{PR}$ together so as to obtain new delayed present value data $S_{PR}$ of eight bits. At the same time, the control signal $S_{CR}$ having the logical level of "1" is outputted by a cycle corresponding to a probability which corresponds to the value of the decimal data $S_{DC}$.

As a result, the adder 202 adds "1" to the value of the integral data $S_{IT}$ under a probability corresponding to the value of the decimal data $S_{DC}$, so that it is possible to obtain the present value data $S_{PRX}$ based on the value of the decimal data $S_{DC}$. As a result, it is possible to make the constitution of the adder 202 simple by using the adder of eight bits.

Figure 14:
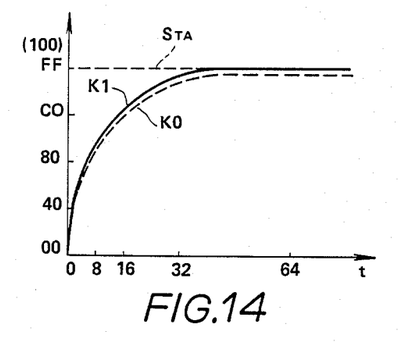
FIG. 14 is a graph showing an experimental result of the circuit shown in FIG. 8.

FIG. 14 shows an experimental result of the circuit shown in FIG. 8. In FIG. 14, the error was occurred between the value of the target value data $S_{TA}$ and a value of a function signal K0 in the conventional circuit, however, it was possible to generate a function signal K1 without errors in the circuit shown in FIG. 8 according to the present invention.

Above is the whole description of the present invention. However, the present invention may be practiced or embodied in still other ways without departing from the spirit or essential character thereof. For instance, it is possible to perform a serial operation by use of serial data instead of performing a parallel operation by use of parallel data as described before. In addition, one series of function signal $S_{OUT}$ is obtained in the circuit shown in FIG. 8, however, it is possible to sequentially perform a time-division-operation for each series of function signal, whereby it is possible to obtain a plurality of series of function signals so as to produce envelope waveforms. These envelope waveforms can be added to corresponding musical tones, for example. Furthermore, it is possible to apply the present invention for the digital filter, the reverberation effect apparatus for the electronic musical instrument and other circuits which use the data of upper bits within the multiplication result as substantial multiplication output data.

Therefore, the preferred embodiments described herein are illustrative and not restrictive, the scope of the invention being indicated by the appended claims and all variations which come within the meaning of the claims are intended to be embraced therein.

What is claimed is:

1. A multiplier circuit comprising:
   (a) multiplier means for multiplying input data by multiplier coefficient data so as to obtain product data;
   (b) compensation means for generating error compensation data which is constituted by lower data of predetermined lower bits and upper data of upper bits above said predetermined lower bits, said lower data being constituted by random number data and a value of said upper data being equal to zero;
   (c) addition means for adding said error compensation data to said product data so as to obtain addition data, and output data being obtained by removing data of said predetermined lower bits from said addition data.

2. A multiplier circuit according to claim 1, wherein a value of said multiplier coefficient data indicates a decimal under one and a value of said error compensation data indicates a decimal under one.

3. A multiplier circuit according to claim 1, wherein said input data is constituted by data of M bits, said multiplier coefficient data being constituted by data of N bits, said product data being constituted by data of M+N bits, said upper data being constituted by data of M bits, said lower data being constituted by data of N bits and said output data being constituted by data of M bits (where M and N denote integral numbers).

4. A multiplier circuit according to claim 1, wherein said compensation means further includes random number generating means for generating said random number data of N bits.

5. A multiplier circuit comprising:
   (a) multiplier means for multiplying input data by multiplier coefficient data so as to obtain product data, said product data being divided into lower data of predetermined lower bits and upper data of upper bits above said predetermined lower bits;
   (b) carry control means for generating a control signal, a value of said control signal becoming zero or one in accordance with a probability corresponding to a value of said lower data within said product data; and
   (c) addition means for adding said upper data and said value of control signal together so as to obtain addition data, and said addition data being outputted as output data.

6. A multiplier circuit according to claim 5, wherein a value of said multiplier coefficient data indicates a decimal under one and a value of said lower data indicates a decimal under one.

7. A multiplier circuit according to claim 5, wherein said input data is constituted by data of M bits, said multiplier coefficient data being constituted by data of N bits, said product data being constituted by data of M+N bits, said upper data being constituted by data of M bits, said lower data being constituted by data of N bits and said output data being constituted by data of M bits (where M and N denote integral numbers).

8. A multiplier circuit according to claim 5, wherein said carry control means further includes probability generating means and control signal generating means therein, said probability generating means generating probability data of N bits of which value changes from $2^0$ to $2^{N-1}$ repeatedly, said control signal generating means generating said control signal based on said lower data and said probability data.

9. A multiplier circuit according to claim 8, wherein said probability generating means further includes counter means, encoder means and decoder means therein, said counter means counting a clock signal having a predetermined frequency so as to output count data of N bits, said encoder means generating encode data of predetermined bits of which bit number is smaller than N, a value of said encode data changing based on a position of the first bit datum of which value becomes one when searching from lower bit to upper bit within said encode data, and said decoder means decoding said encode data so as to generate said probability data of N bits.

10. A multiplier circuit comprising:
   (a) multiplying means for multiplying input data by multiplier coefficient data so as to obtain product data;
   (b) compensation data generating means for generating error compensation data consisting of plural bits, a predetermined lower bit portion of said error compensation data being a random number whose value varies at random with a lapse of time and an upper bit portion above said predetermined lower bit portion of said error compensation data having value of zero;
   (c) addition means for adding said error compensation data to said product data so as to obtain addition data, a predetermined upper bits only of said addition data being used as a multiplied value of said multiplier circuit.

* * * * *